United States Patent
Warke et al.

(10) Patent No.: US 9,258,107 B1
(45) Date of Patent: Feb. 9, 2016

(54) LOCAL OSCILLATOR PHASE NOISE TRACKING FOR SINGLE CARRIER TRANSMISSION

(71) Applicant: Texas Instruments Incorporated, Dallas, TX (US)

(72) Inventors: Nirmal C. Warke, Saratoga, CA (US); Lars Morten Jorgensen, Royal Oaks, CA (US); Srinath Hosur, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/580,595

(22) Filed: Dec. 23, 2014

(51) Int. Cl.
*H04L 7/00* (2006.01)
*H04L 7/02* (2006.01)

(52) U.S. Cl.
CPC ............... *H04L 7/0016* (2013.01); *H04L 7/02* (2013.01)

(58) Field of Classification Search
CPC . H04L 7/0016; H04L 7/02; H04L 2027/0032; H04L 2027/0057; H04L 2027/0067; H04L 2027/0087; H04L 27/0014; H04L 1/0045
See application file for complete search history.

(56) References Cited

U.S. PATENT DOCUMENTS

| | | | | |
|---|---|---|---|---|
| 7,292,652 B2* | 11/2007 | Luo | ...................... | H04L 27/0014 375/316 |
| 8,258,877 B2* | 9/2012 | Goel | ................... | H03F 3/45188 327/154 |
| 8,938,037 B1* | 1/2015 | Fard | ...................... | H04L 1/0036 375/229 |
| 2004/0252229 A1* | 12/2004 | Jiang et al. | ................. | 348/385.1 |
| 2005/0123073 A1* | 6/2005 | Ginesi et al. | .................. | 375/326 |
| 2007/0066268 A1* | 3/2007 | Simic | ..................... | G01S 19/235 455/318 |
| 2007/0086533 A1* | 4/2007 | Lindh | ........................... | 375/260 |
| 2009/0142076 A1* | 6/2009 | Li | .......................... | H04B 10/61 398/208 |
| 2010/0050047 A1* | 2/2010 | Choi | ..................... | H04L 1/0065 714/755 |
| 2013/0077563 A1* | 3/2013 | Kim et al. | ..................... | 370/324 |
| 2013/0315346 A1* | 11/2013 | Varma et al. | .................. | 375/316 |
| 2015/0098535 A1* | 4/2015 | Wu et al. | ....................... | 375/350 |

* cited by examiner

*Primary Examiner* — Hirdepal Singh
(74) *Attorney, Agent, or Firm* — Ronald O. Neerings; Frank D. Cimino

(57) ABSTRACT

A system and method for tracking noise in a received signal uses a forward/backward Decision-Directed Phase Tracking Loop to generate a phase-noise compensation signal that removes phase noise from received single-carrier signals.

10 Claims, 4 Drawing Sheets

LOCAL OSCILLATOR PHASE NOISE TRACKING FOR SINGLE CARRIER TRANSMISSION

BACKGROUND

In a single carrier based communication system operating at high carrier frequencies in either microwave (uWave) or E-band (eBand), phase noise from the transmit and receive radio frequency (RF) carrier local oscillators (LO) significantly corrupts transmission. Phase noise on the carrier is a significant impairment to supporting higher order modulations.

Digital baseband data is modulated, such as using 256-QAM (Quadrature Amplitude Modulation), onto a carrier and up-converted to an RF carrier frequency using an LO signal. Phase noise is introduced in the up-converted signal by the LO signal. This causes the QAM constellation to rotate as the LO phase changes over time.

SUMMARY OF THE INVENTION

Embodiments of the invention provide a forward/backward Decision-Directed Phase Tracking Loop (DDPLL) that removes phase noise from received single-carrier signals.

One embodiment of a system for correcting phase error in a received signal comprises a first buffer that is configured to store a block of input symbols. The block of input symbols starts with a first pilot symbol and ends with a last pilot symbol. The block of input symbols comprises unknown data symbols between the first pilot symbol and the last pilot symbol and may include additional pilot symbols between the first last pilot symbols. A phase rotator is configured to apply phase-noise compensation to the block of input symbols on a symbol-by-symbol basis. A feedback loop is coupled to the phase rotator and provides a phase-noise compensation signal to the phase rotator. The phase compensation signal provided may be generated based upon phase-noise-error detection for each pilot symbol, phase-noise-error detection over an entire block of input symbols, phase-noise-error detection using every Nth pilot symbol in the block of input symbols, or any other appropriate process.

A first output buffer is configured to store a first block of phase-noise-compensated symbols output from the phase-rotator. The symbols in the first block of phase-noise-compensated symbols are sequentially received from the phase rotator starting with the first pilot symbol. A second output buffer is configured to store a second block of phase-noise-compensated symbols output from the phase-rotator. The symbols in the second block of phase-noise-compensated symbols are sequentially received from the phase rotator starting with the last pilot symbol. A combiner is configured to combine associated symbols from the first and second blocks of phase-noise-compensated symbols to create output symbols.

The feedback loop comprises a hard decision module that receives the output from the phase rotator and determines a closest point in a modulation constellation for each received symbol. A phase estimator in the feedback loop receives a first input from the phase rotator and a second input from the hard decision module. A loop filter is coupled to the output of the phase estimator. A numerically controlled oscillator is coupled to the output of the loop filter. The numerically controlled oscillator providing the phase-noise compensation signal to the phase rotator.

The associated symbols from the first and second blocks of phase-noise-compensated symbols may be combined using a process selected from the group consisting of symbol-by-symbol averaging, weighted symbol-by-symbol combining; and weighted symbol-by-symbol combining using an error metric, a Log-Likelihood Ratio (LLR) metric, a Minimum-Mean-Square Error (MMSE) error metric, and the like. The output symbols may be created by selecting a more reliable phase-noise-compensated symbol between associated symbols within the first and second blocks of phase-noise-compensated symbols.

The initial phase-noise-error compensation that is applied to the first-received pilot symbol for a block of input symbols may be based upon, for example, a phase-noise-error compensation applied to a prior block of input symbols or to a last symbol in a prior block of input symbols.

A Forward Error Correction (FEC) decoder may be coupled to an output of the combiner and configured to decode the output symbols. The output of the FEC decoder may be coupled to the phase estimator. The phase estimator may use decoded output symbols in place of the input from the hard decision module. One or more additional iterations of tracking phase-noise error may be applied using the decoded symbols from the FEC decoder.

BRIEF DESCRIPTION OF THE DRAWINGS

Figure 1:
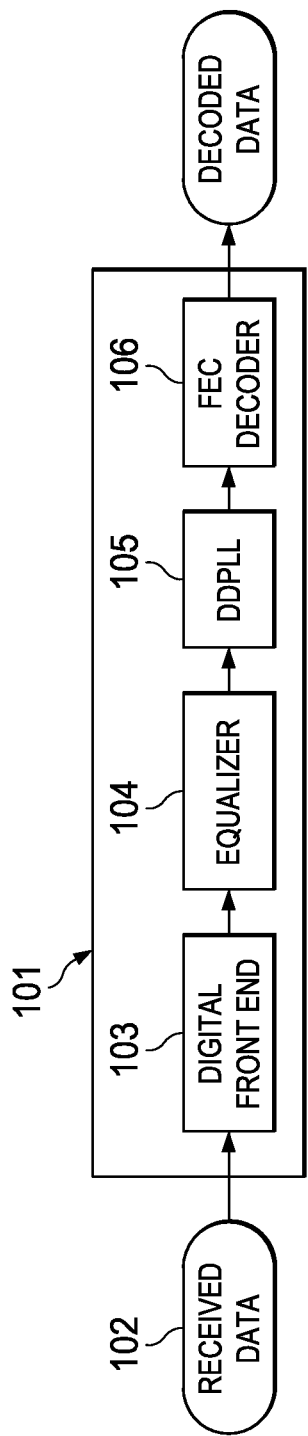

Having thus described the invention in general terms, reference will now be made to the accompanying drawings, wherein:

FIG. 1 is a block diagram of a receiver according to one embodiment.

Figure 2:
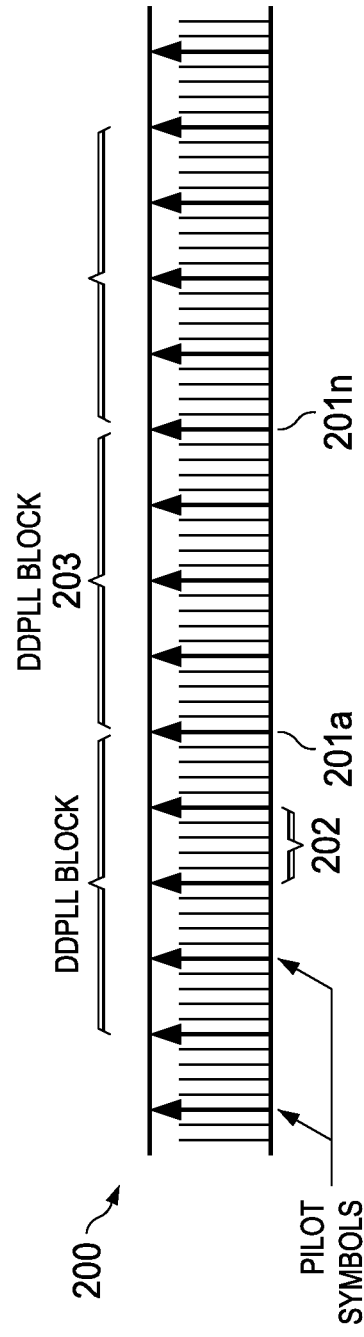

FIG. 2 illustrates a continuous stream of single carrier modulated data that may be processed using disclosed embodiments.

Figure 3:
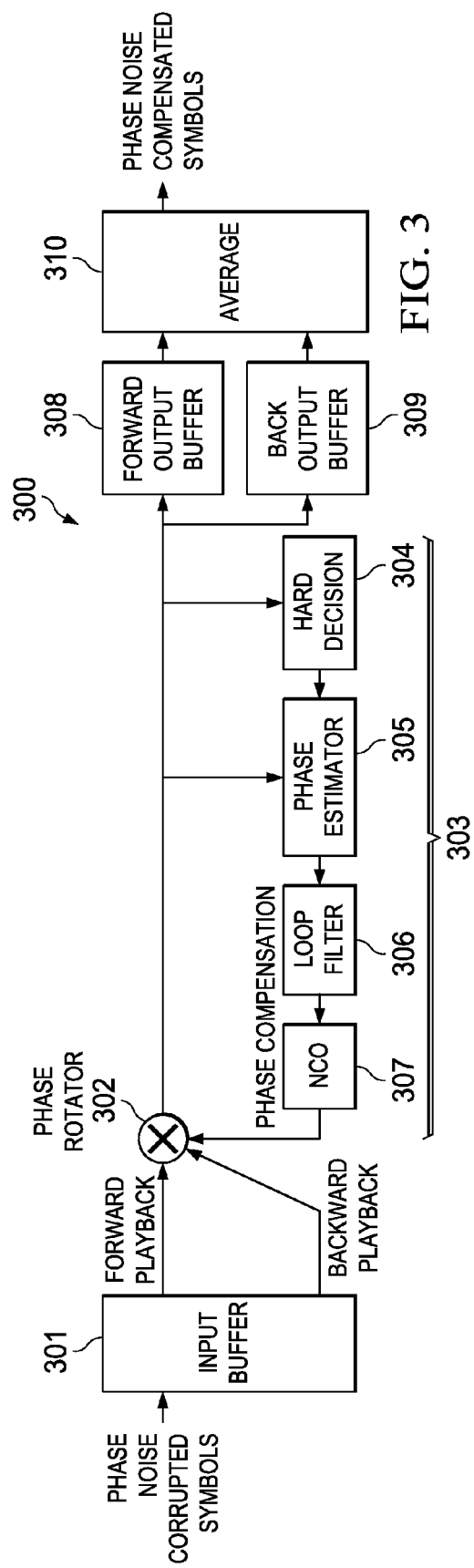

FIG. 3 is a block diagram of one embodiment of a forward/backward DDPLL.

Figure 4:
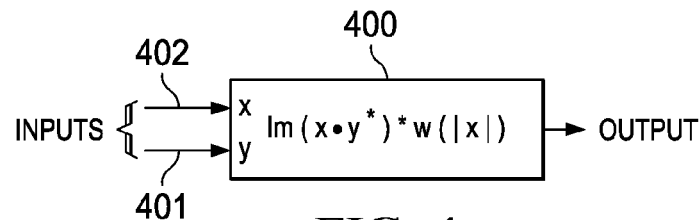

FIG. 4 is a block diagram of a DDPLL phase estimator according to one embodiment.

Figure 5:
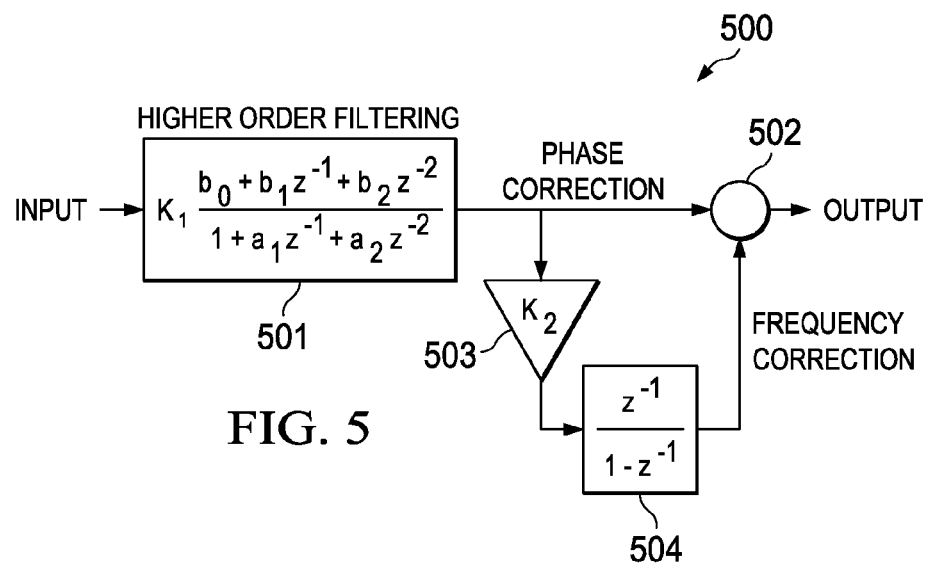

FIG. 5 is a block diagram of a second-order loop filter according to one embodiment of the DDPLL.

Figure 6:
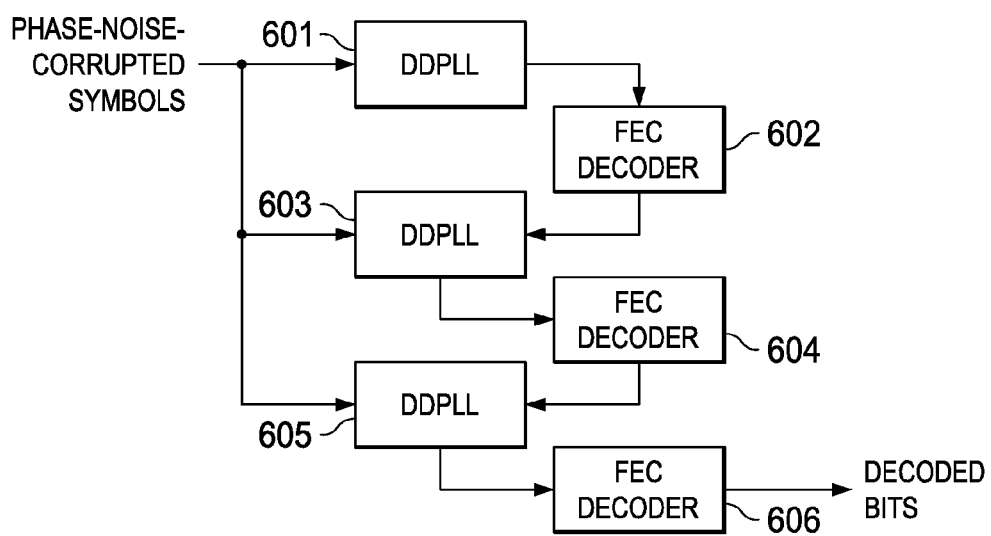

FIG. 6 illustrates another embodiment in which the DDPLL method described above is iterated with the FEC decoder.

Figure 7:
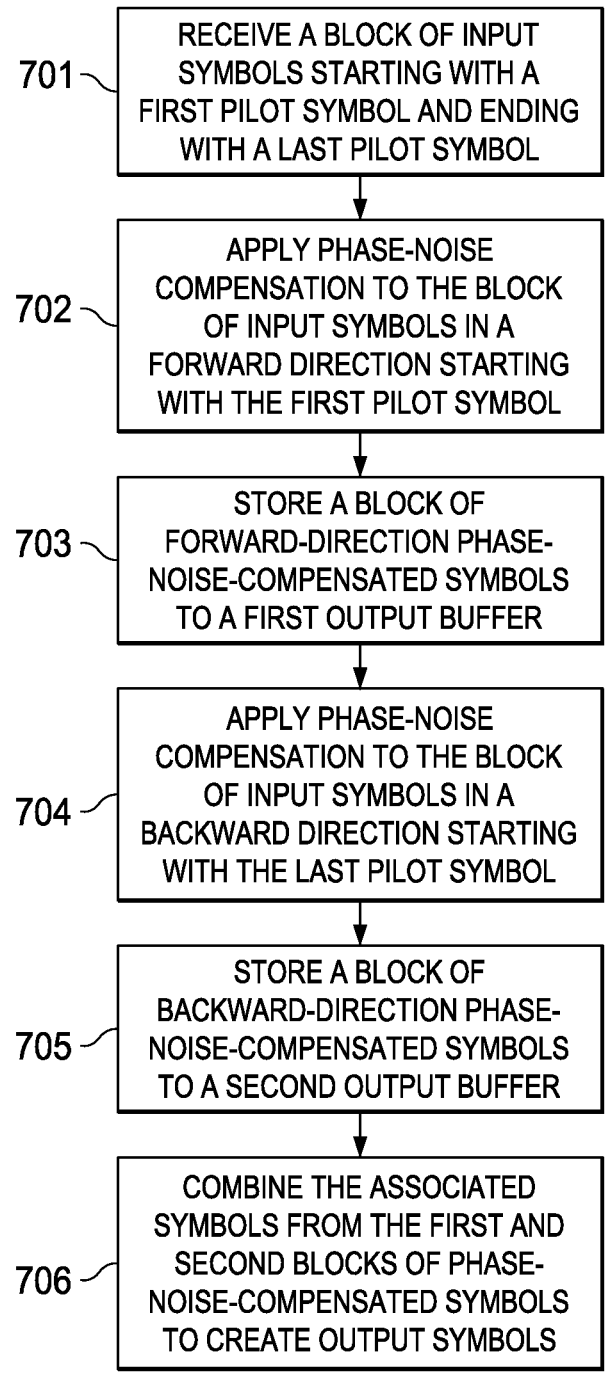

FIG. 7 is a flowchart illustrating a method for correcting phase error in a received signal according to one embodiment.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

FIG. 1 is a block diagram of a receiver 101 according to one embodiment. Data 102 is down converted and input to receiver 101. Received data is processed in digital front end 103 and equalizer 104. Forward/backward DDPLL 105 removes phase noise in the equalized symbols and provides an input to FEC decoder 106.

FIG. 2 illustrates a continuous stream of single carrier modulated data 200 that may be received at the input to DDPLL 105 of receiver 101. Periodic known pilot symbols 201 are inserted into the data stream by the transmitter. Between each known pilot symbol 201 are unknown data symbols 202. As illustrated in FIG. 2, the symbols in the single carrier modulated data 200 are grouped into DDPLL blocks 203. Each DDPLL block begins with a pilot symbol 201a and ends with another pilot symbol 201n. There may be any number of additional pilot symbols and unknown data symbols between the beginning and ending pilot symbols 201a, 201n for each DDPLL block.

FIG. 3 is a block diagram of one embodiment of a forward/backward DDPLL 300. Phase-noise-corrupted symbols are received at the input to forward/backward DDPLL 300. The phase-noise-corrupted symbols may comprise single carrier modulated data as illustrated in FIG. 2. The phase-noise-corrupted symbols may be passed to the forward/backward DDPLL from a digital front end and equalizer as illustrated in receiver 101 of FIG. 1. The phase-noise-corrupted symbols are stored to input buffer 301 as groups of symbols in a DDPLL block.

Input buffer 301 provides the input to phase rotator 302, which provides a phase rotation based on the latest phase estimate in the DDPLL. The symbols in the phase-noise-corrupted block that is stored in input buffer 301 may be played into phase rotator 302 in both the forward and backward directions. A DDPLL block 203 having beginning and ending pilot symbols 201a, 201n may be alternately provided from input buffer to phase rotator 302 starting with known pilot symbol 201a (i.e., forward playback) or starting with known pilot symbol 201n (i.e., backward playback).

Phase rotator 302 applies phase-noise compensation to the received symbols to counteract the phase rotation in the received signal. The phase-noise compensation is generated by a second order loop that tracks phase and frequency. Feedback loop 303 comprising hard decision block 304, phase estimator 305, loop filter 306, and numerically controlled oscillator (NCO) 307. Phase estimator 305 receives two inputs. One input is the unmodified output of phase rotator 302. The other input comes from hard decision 304, which estimates the demodulated symbol. Hard decision 304 compares the symbols in the output of phase rotator 302 to the relevant modulation constellation. The output of hard decision block 304 corresponds to the actual point constellation point that is closest to each symbol in the output of phase rotator 302.

Phase estimator 305 generates a phase-error estimate based upon the input and output of hard decision 304. Phase estimator 305 compares the two inputs and estimates the phase difference between the symbols that have been corrected by phase rotator 302 and the intended phase for each symbol.

The output of phase estimator 305 is filtered in loop filter 306 to remove noise outside the signal bandwidth. NCO 307 accumulates filtered error estimates and provides the latest phase estimate as an a phase-noise compensation signal to phase rotator 302.

When phase rotator 302 receives a forward playback of phase-noise-corrupted symbols from input buffer 301, the phase-noise-compensated symbols output from phase rotator 302 are stored to forward output buffer 308. When phase rotator 302 receives a backward playback of phase-noise-corrupted symbols from input buffer 301, the phase-noise-compensated symbols output from phase rotator 302 are stored to backward output buffer 309. Output buffers 308 and 309 are generally the same size as input buffer 301 as they store the same number of symbols. Averaging block 310 then averages or combines the forward and backward phase-noise-compensated symbols to generate input data for the FEC decoder.

DDPLL 300 operates over blocks of data that can span several pilot symbols as illustrated in FIG. 2. The DDPLL phase is reset at the start of processing each block of phase-noise-corrupted symbols and tracks over that block. The start phase for the block may be initialized with the phase estimate based on the known pilot symbols on the ends of the block—e.g., known pilot symbols 201a or 201n. In other embodiments, the start phase for the DDPLL may be initialized based on an error metric, such as a Minimum-Mean-Square Error (MMSE) phase estimate over a window of data symbols on either side of the pilot assuming the phase to be constant over the window.

For each block of phase-noise-corrupted symbols, the DDPLL may apply a different weight to the unknown data symbols compared to the known pilot symbols since the phase error detection in the known pilots will have greater reliability. Each block has a forward and backward run through DDPLL 300. The forward DDPLL run starts with the pilot symbol that occurs first in time (e.g., pilot 201a), and the backward DDPLL starts with the pilot that occurs later in time at the end of the phase-noise-corrupted block (e.g., pilot 201n). The phase-noise-compensated symbols from the forward and backward DDPLL runs are combined to generate effective phase-noise-compensated samples over the block. In other embodiments, the phase-noise estimates from the forward and backward DDPLL runs are combined over the block. The phase-noise-compensated symbols may be combined using any appropriate method, such as a simple symbol-by-symbol average, a weighted symbol-by-symbol combining using the Log-Likelihood Ratio (LLR) metric, or a weighted combining of the forward and backward DDPLL runs based on an error metric such as the MMSE over the block. Alternatively, the error metric may determine which run—the forward or backward run—generates the more accurate phase compensation. The (forward or backward) run with the most accurate phase compensation may then be used as the input to the FEC decoder without combining the two runs.

FIG. 4 is a block diagram of a DDPLL phase estimator 400 according to one embodiment. DDPLL phase estimator has two inputs. Input 401 (y) is the phase noise compensated sample from the phase rotator, which also serves as the input to the hard decision block. Input 402 (x) is the hard decision value output by the hard decision block. The function $\text{Im}(x \cdot y^*)$ provides an estimate of the phase error. An optional weighting function $w(|x|)$ may be applied to the phase error estimate. The weighting function is based upon the magnitude of the hard decision input (x). For example, in a system using QAM modulation, smaller amplitudes may be more affected by thermal noise and hence the phase-noise estimate from them may be less reliable.

FIG. 5 is a block diagram of a second-order loop filter 500 according to one embodiment of the DDPLL. The input to loop filter 500 is the output of the phase estimator. Higher order filtering 501 eliminates noise outside the bandwidth of the DDPLL and provides a phase correction to combiner 502. The output of filter 501 also passes through amplifier 503 and integrator/accumulator 504 to provide a frequency correction. The phase correction and frequency correction are combined in 502 to generate an input to the NCO.

In a further embodiment, user bits may be loaded on to the pilot symbols with sufficient margin for reliable decoding of the pilot relative to the data symbols. For example, in a system that uses 256 QAM modulation for data symbols, data may be modulated on to the pilots symbols using 32 or 64 QAM.

FIG. 6 illustrates another embodiment in which the DDPLL method described above is iterated with the FEC decoder. Phase-noise-corrupted symbols are cleaned up in a first DDPLL run 601. The phase-noise-compensated samples from the first DDPLL run are provided to the FEC decoder for a first decoding 602. The decoded symbols output from FEC decoder run 602 have a much lower error rate compared to the hard decision symbols used in the first run of DDPLL 601 by virtue of the coding gain provided by the FEC. The DDPLL can be run for a second time 603 (i.e., first iteration) using the decoded symbols from FEC decoding 602 rather than making hard decisions. The DDPLL hard decisions are not completely reliable and may make errors in the phase estimate, which would inadvertently add error in tracking the phase in the symbols.

Using the decoded symbols substantially increases the performance of the DDPLL. The DDPLL cleaned up samples from the second run 603 are then sent for a second FEC decoding 604. If the FEC decoding improves quality, then the process may be repeated for subsequent DDPLL 605 and FEC decoding 606 iterations.

In this embodiment, the hard decision is used to estimate and track phase for the first DDPLL run. The FEC decoder is used in place of the hard decision in the second and subsequent runs. As a result, more reliable phase-noise-compensated symbols are provided to the subsequent FEC decoder runs.

It will be understood that embodiments may be used with any digital modulation scheme, such as QAM, Quadrature Phase Shift Keying (QPSK), etc.

The DDPLL may process the symbol blocks in different ways for various embodiments. For example, the DDPLL may make symbol-by-symbol corrections to the phase error correction in one embodiment and provide an symbol-by-symbol output to the FEC decoder. In another embodiment, the DDPLL may store an entire block and track the phase across the entire block, such as estimating one phase error correction to be applied to the entire block. This embodiment may provide a block-by-block output to the FEC decoder. In alternative embodiments, the DPPLL may assume that the phase error is constant across multiple symbols and may use every $N^{th}$ symbol to determine the phase-error correction to be applied by the phase rotator.

FIG. 7 is a flowchart illustrating a method for correcting phase error in a received signal according to one embodiment. In step 701, a block of input symbols is received. The block of input symbols starts with a first pilot symbol and ending with a last pilot symbol. The block of input symbols may be stored to an input buffer. The block of input symbols includes unknown data symbols between the first pilot symbol and the last pilot symbol and may also include additional pilot symbols between the first and last pilot symbols.

In step 702, phase-noise compensation is applied to the block of input symbols in a forward direction starting with the first pilot symbol. In step 703, a first block of phase-noise-compensated symbols are stored to a first output buffer. The first block of phase-noise-compensated symbols corresponding to the forward-direction block of input symbols.

In step 704, phase-noise compensation is applied to the block of input symbols in a backward direction starting with the last pilot symbol. In step 705, a second block of phase-noise-compensated symbols is stored to a second output buffer. The second block of phase-noise-compensated symbols corresponding to the backward-direction block of input symbols.

In step 706, associated symbols from the first and second blocks of phase-noise-compensated symbols are combined to create output symbols. The associated symbols from the first and second blocks of phase-noise-compensated symbols may be combined to create output symbols using a process such as symbol-by-symbol averaging, weighted symbol-by-symbol combining, weighted symbol-by-symbol combining using an error metric, weighted symbol-by-symbol combining using a LLR metric, weighted symbol-by-symbol combining using a MMSE error metric. Alternatively, the output symbols may be created by selecting which phase-compensated symbol is more reliable between associated symbols within the first and second blocks of phase-compensated symbols.

A phase-noise compensation signal may be generated in a feedback loop comprising a hard decision module receiving phase-noise-compensated symbols and determining a closest point in a modulation constellation for each received symbol, a phase estimator phase estimator receiving phase-noise-compensated symbols at a first input and receiving an output from the hard decision module at a second input, a loop filter coupled to an output of the phase estimator, and a numerically controlled oscillator coupled to an output of the loop filter, the numerically controlled oscillator providing the phase-noise compensation signal to a phase rotator.

The phase-noise compensation signal may be generated using one or more of phase-noise-error detection for each pilot symbol, phase-noise-error detection over an entire block of input symbols, or phase-noise-error detection using every Nth pilot symbol in the block of input symbols.

The initial phase-noise-error compensation applied to the first-received pilot symbol from the block of input symbols (e.g., the first pilot symbol in the forward direction or the last pilot symbol in the backward direction) may be based upon a phase-noise-error compensation applied to a prior block of input symbols or to a last symbol in a prior block of input symbols.

The output symbols may be provided to a FEC decoder. Decoded symbols from the FEC decoder may be used to apply phase-noise compensation to the block of input symbols in a forward direction and backward direction during one or more additional iterations.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. A decision-directed phase lock loop for correcting phase error in a received signal, comprising:
   a first buffer configured to store a block of input symbols, the block of input symbols starting with a first pilot symbol and ending with a last pilot symbol;
   a phase rotator configured to apply a phase-noise compensation to the block of input symbols on a symbol-by-symbol basis;
   a feedback loop coupled to the phase rotator, the feedback loop providing a phase-noise compensation signal to the phase rotator;
   a first output buffer configured to store a first block of phase-noise-compensated symbols output from the phase-rotator, where the symbols in the first block of phase-noise-compensated symbols are sequentially received from the phase rotator starting with the first pilot symbol;
   a second output buffer configured to store a second block of phase-noise-compensated symbols output from the phase-rotator, where the symbols in the second block of phase-noise-compensated symbols are sequentially received from the phase rotator starting with the last pilot symbol; and a combiner configured to combine associated symbols from the first and second blocks of phase-noise-compensated symbols to create output symbols, wherein the associated symbols from the first and second blocks of phase-noise-compensated symbols are combined using a process selected from the group consisting of:
weighted symbol-by-symbol combining using a Log-Likelihood Ratio (LLR) metric; and
weighted symbol-by-symbol combining using a Minimum-Mean-Square Error (MMSE) error metric.

2. A decision-directed phase lock loop for correcting phase error in a received signal, comprising:
a first buffer configured to store a block of input symbols, the block of input symbols starting with a first pilot symbol and ending with a last pilot symbol, wherein the block of input symbols comprises unknown data symbols and additional pilot symbols between the first pilot symbol and the last pilot symbol;
a phase rotator configured to apply a phase-noise compensation to the block of input symbols on a symbol-by-symbol basis;
a feedback loop coupled to the phase rotator, the feedback loop providing a phase-noise compensation signal to the phase rotator, wherein the phase compensation signal provided to the phase rotator is generated using a process selected from the following group:
phase-noise-error detection over an entire block of input symbols; and
phase-noise-error detection using every $N^{th}$ pilot symbol in the block of input symbols;
a first output buffer configured to store a first block of phase-noise-compensated symbols output from the phase-rotator, where the symbols in the first block of phase-noise-compensated symbols are sequentially received from the phase rotator starting with the first pilot symbol;
a second output buffer configured to store a second block of phase-noise-compensated symbols output from the phase-rotator, where the symbols in the second block of phase-noise-compensated symbols are sequentially received from the phase rotator staring with the last pilot symbol; and
a combiner configured to combine associated symbols from the first and second blocks of phase-noise-compensated symbols to create output symbols.

3. A decision-directed phase lock loop for correcting phase error in a received signal, comprising:
a first buffer configured to store a block of input symbols, the block of input symbols starting with a first pilot symbol and ending with a last pilot symbol;
a phase rotator configured to apply a phase-noise compensation to the block of input symbols on a symbol-by-symbol basis, wherein the phase rotator is configured to apply an initial phase-noise-error compensation to a first-received pilot symbol from the block of input symbols based upon a phase-noise-error compensation applied to a prior block of input symbols;
a feedback loop coupled to the phase rotator, the feedback loop providing a phase-noise compensation signal to the phase rotator;
a first output buffer configured to store a first block of phase-noise-compensated symbols output from the phase-rotator, where the symbols in the first block of phase-noise-compensated symbols are sequentially received from the phase rotator starting with the first pilot symbol;
a second output buffer configured to store a second block of phase-noise-compensated symbols output from the phase-rotator, where the symbols in the second block of phase-noise-compensated symbols are sequentially received from the phase rotator staring with the last pilot symbol; and
a combiner configured to combine associated symbols from the first and second blocks of phase-noise-compensated symbols to create output symbols.

4. The decision-directed phase lock loop of claim 3, wherein the initial phase-noise-error compensation of a first-received pilot symbol from the block of input symbols is based upon a phase-noise-error compensation applied to a last symbol in a prior block of input symbols.

5. A decision-directed phase lock loop for correcting phase error in a received signal, comprising:
a first buffer configured to store a block of input symbols, the block of input symbols starting with a first pilot symbol and ending with a last pilot symbol;
a phase rotator configured to apply a phase-noise compensation to the block of input symbols on a symbol-by-symbol basis;
a feedback loop coupled to the phase rotator, the feedback loop providing a phase-noise compensation signal to the phase rotator, wherein a hard decision module in the feedback loop receives an output from the phase rotator and determines a closest point in a modulation constellation for each received symbol, wherein a phase estimator in the feedback loop receives a first input from the phase rotator and a second input from the hard decision module;
a first output buffer configured to store a first block of phase-noise-compensated symbols output from the phase-rotator, where the symbols in the first block of phase-noise-compensated symbols are sequentially received from the phase rotator starting with the first pilot symbol;
a second output buffer configured to store a second block of phase-noise-compensated symbols output from the phase-rotator, where the symbols in the second and block of phase-noise-compensated symbols are sequentially received from the phase rotator starting with the last pilot symbol;
a combiner configured to combine associated symbols from the first and second blocks of phase-noise-compensated symbols to create output symbols; and a Forward Error Correction (FEC) decoder coupled to an output of the combiner and configured to decode the output symbols, wherein an output of FEC decoder is coupled to the phase estimator, the phase estimator configured to use decoded output symbols in place of the input from the hard decision module.

6. A method for correcting phase error in a received signal, comprising:
receiving a block of input symbols starting with a first pilot symbol and ending with a last pilot symbol;
applying phase-noise compensation to the block of input symbols in a forward direction starting with the first pilot symbol;
storing a first block of phase-noise-compensated symbols to a first output buffer, the first block of phase-noise-compensated symbols corresponding to the forward-direction block of input symbols;
applying phase-noise compensation to the block of input symbols in a backward direction starting with the last pilot symbol;

storing a second block of phase-noise-compensated symbols to a second output buffer, the second block of phase-noise-compensated symbols corresponding to the backward-direction block of input symbols; and combining the associated symbols from the first and second blocks of phase-noise-compensated symbols to create output symbols using a process selected from the group consisting of:

weighted symbol-by-symbol combining using a Log-Likelihood Ratio (LLR) metric; and weighted symbol-by-symbol combining using a Minimum-Mean-Square Error (MMSE) error metric.

7. A method for correcting phase error in a received signal, comprising:

receiving a block of input symbols staring with a first pilot symbol and ending with a last pilot symbol, wherein the block of input symbols comprises unknown data symbols and additional pilot symbols between the first pilot symbol and the last pilot symbol;

applying phase-noise compensation to the block of input symbols in a forward direction starting with the first pilot symbol;

generating said phase-noise compensation using a process selected from the following group:

phase-noise-error detection over an entire block of input symbols; and phase-noise-error detection using every Nth pilot symbol in the block of input symbols, storing a first block of phase-noise-compensated symbols to a first output buffer, the first block of phase-noise-compensated symbols corresponding to the forward-direction block of input symbols;

applying said selected phase-noise compensation to the block of input symbols in a backward direction starting with the last pilot symbol, said compensation;

storing a second block of phase-noise-compensated symbols to a second output buffer, the second block of phase-noise-compensated symbols corresponding to the backward-direction block of input symbols;

combining the associated symbols from the first and second blocks of phase-noise-compensated symbols to create output symbols.

8. A method for correcting phase error in a received signal, comprising:

receiving a block of input symbols starting with a first pilot symbol and ending with a last pilot symbol;

applying phase-noise compensation to the block of input symbols in a forward direction starting with the first pilot symbol;

wherein an initial phase-noise-error compensation of a first-received pilot symbol from the block of input symbols is based upon a phase-noise-error compensation applied to a prior block of input symbols;

storing a first block of phase-noise-compensated symbols to a first output buffer, the first block of phase-noise-compensated symbols corresponding to the forward-direction block of input symbols;

applying phase-noise compensation to the block of input symbols in a backward direction starting with the last pilot symbol;

storing a second block of phase-noise-compensated symbols to a second output buffer, the second block of phase-noise-compensated symbols corresponding to the backward-direction block of input symbols; and combining the associated symbols from the first and second blocks of phase-noise-compensated symbols to create output symbols.

9. The method of claim 8, wherein an initial phase-noise-error compensation of the first-received pilot symbol from the block of input symbols is based upon a phase-noise-error compensation applied to a last symbol in a prior block of input symbols.

10. A method for correcting phase error in a received signal, comprising:

receiving a block of input symbols starting with a first pilot symbol and ending with a last pilot symbol;

applying phase-noise compensation to the block of input symbols in a forward direction starting with the first pilot symbol;

storing a first block of phase-noise-compensated symbols to a first output buffer, the first block of phase-noise-compensated symbols corresponding to the forward-direction block of input symbols;

applying phase-noise compensation to the block of input symbols in a backward direction starting with the last pilot symbol;

storing a second block of phase-noise-compensated symbols to a second output buffer, the second block of phase-noise-compensated symbols corresponding to the backward-direction block of input symbols;

combining the associated symbols from the first and second blocks of phase-noise-compensated symbols to create output symbols;

providing the output symbols to a Forward Error Correction (FEC) decoder; and using decoded symbols from the FEC decoder to apply phase-noise compensation to the block of input symbols in a forward direction and backward direction during one or more additional iterations.

* * * * *